United States Patent [19]
Oh

[11] Patent Number: 5,683,162
[45] Date of Patent: Nov. 4, 1997

[54] DEVICE AND METHOD FOR AUTOMATICALLY ROTATING A STOP LAMP

[75] Inventor: Young-Sup Oh, Taegu-si, Rep. of Korea

[73] Assignee: Hyundai Motor Company, Ltd., Seoul, Rep. of Korea

[21] Appl. No.: 630,178

[22] Filed: Apr. 11, 1996

[30] Foreign Application Priority Data

Apr. 12, 1995 [KR] Rep. of Korea .................. 95-8447

[51] Int. Cl.$^6$ ......................................... B60Q 1/34
[52] U.S. Cl. .................. 362/61; 362/80.1; 362/83.3
[58] Field of Search .................. 362/61, 80, 71, 362/80.1, 83.3, 269, 284, 427, 384; 340/467, 479

[56] References Cited

U.S. PATENT DOCUMENTS

| 652,493 | 6/1900 | Terrell et al. | 362/384 |
|---|---|---|---|
| 1,593,075 | 7/1926 | Hensley | 362/384 |
| 1,785,332 | 12/1930 | Thom | 362/384 |

*Primary Examiner*—Y. My Quach

[57] ABSTRACT

A device and method for automatically rotating a stop lamp in a vehicle are disclosed. The device includes a rotatable member having at least first, second and third end portions, a weight mounted on the first end portion of the rotatable member, a rotatable stop lamp connected to the third end portion of the rotatable member, and a movable member connected to the second end portion of the rotatable member, whereby a turn of the vehicle automatically rotates the stop lamp in a substantially opposite direction of the turn so that the driver of a rear vehicle can see the stop lamp at all times and avoid accidents.

20 Claims, 1 Drawing Sheet

DEVICE AND METHOD FOR AUTOMATICALLY ROTATING A STOP LAMP

BACKGROUND OF THE INVENTION

1. Field of the Invention

The present invention relates to an improved rotatable stop lamp device which is high mounted in a vehicle and, more particularly, to a device and method for automatically rotating a stop lamp in a vehicle in accordance with a vehicle turn using centrifugal forces so that the stop lamp is visible at all times to the driver of a rear vehicle.

2. Description of Related Art

Various types of stop lamp devices are known in the art. Generally, a conventional car is provided with a stop lamp disposed within a taillight to indicate to the driver of the rear vehicle when the brakes of the front car are applied. However, in such a conventional car, it is difficult for the driver of the rear car to see the stop lamp because the stop lamp is located at a low position.

In order to solve such problems of the low positioned stop lamp, an auxiliary stop lamp is often located on a spoiler disposed on a top of a car trunk or on a package tray disposed on a rear position of a car room above the back seats. However, as shown in FIG. 4, the conventional high-positioned stop lamp 100" is fixedly positioned on a spoiler or a package tray 30' by a pair of nuts 40 and is thus immovable. Therefore, the driver of a rear car cannot always see the stop lamp 100" of the front car, especially when the front car is making a turn. As a result, accidents occur when the front car suddenly stops in the middle of the turn.

SUMMARY OF THE INVENTION

Accordingly, it is an object of the present invention to provide an improved rotatable stop lamp device high mounted in a vehicle, which eliminates the above problems encountered with conventional stop lamp devices.

Another object of the present invention is to provide a device and method for automatically rotating a stop lamp in a vehicle. The device includes a rotatable member having at least first, second and third end portions, a weight mounted on the first end portion of the rotatable member, a rotatable stop lamp connected to the third end portion of the rotatable member, and a movable member connected to the second end portion of the rotatable member, whereby a turn of the vehicle automatically rotates the stop lamp in a substantially opposite direction of the turn so that the driver of a rear vehicle can see the stop lamp at all times and thus avoid accidents.

A further object of the present invention is to provide the device with a container having hydraulic oil and the movable member therein, and an elongated groove on the top surface of the container so that the rotatable member can be movably fixed to the moving member, whereby the stop lamp can be smoothly rotated in according with the centrifugal force of the vehicle turn.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a high mounted rotatable stop lamp device and a method for automatically rotating a stop lamp in a vehicle. The method includes the steps of: proving a rotatable member having at least first, second and third end portions; mounting a weight on the first end portion of the rotatable member; connecting a movable member to the second end portion of the rotatable member; and connecting the stop lamp to the third end portion of the rotatable member, whereby a turn of the vehicle automatically rotates the stop lamp in a substantially opposite direction of the turn.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
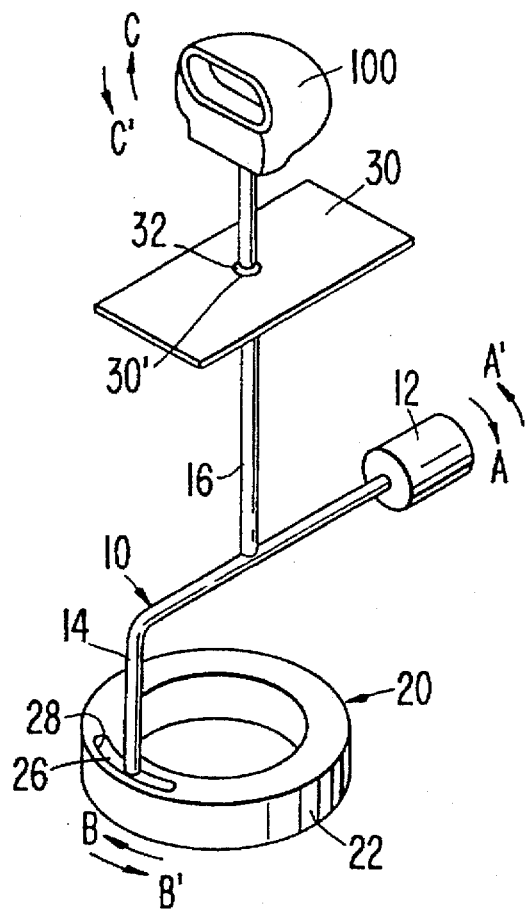
FIG. 1 is a perspective view of a high-mounted, rotatable stop lamp device for a vehicle according to an embodiment of the present invention.
Figure 2:
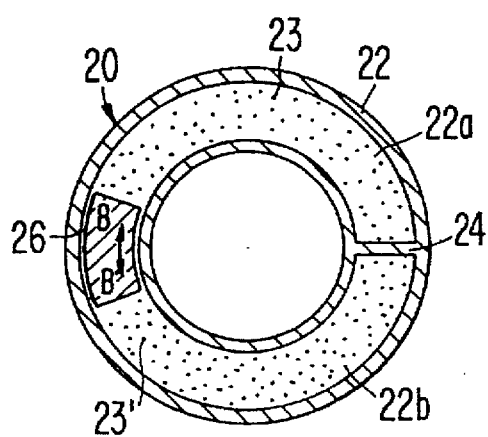
FIG. 2 is a cross sectional view of a hydraulic pressure member of the rotatable stop lamp device according to the present invention.
Figure 4:
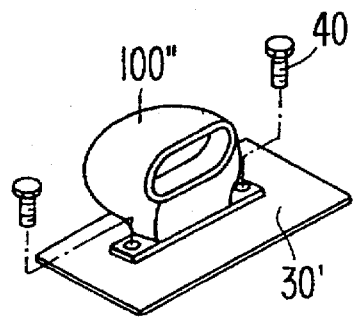
FIG. 4 is an elongated perspective view of a conventional stop lamp device for a vehicle.

Referring now in detail to the drawings for the purpose of illustrating preferred embodiments of the present invention, the rotatable stop lamp device for a vehicle as shown in FIGS. 1 and 2, comprises a stop lamp 100, a rotatable member 10 having a rotatable weight 12 at one end, a bending portion 14 at other end and a rotatable vertical axle 16 at a central portion thereof for supporting the stop lamp 100, and a ring shaped hydraulic pressure member 20 having a hydraulic pressure container 22 with a hollow chamber 23 disposed within the hydraulic pressure container 22 and an elongated groove 28 disposed on a top surface of the hydraulic pressure container 22 for receiving the bending portion 14 of the rotatable member 10.

The stop lamp 100 is fixed on a spoiler or a package tray 30 and the rotatable vertical axle 16 is disposed perpendicular to the package tray 30 through an aperture 30' disposed in the center portion of the package tray 30. A ring shaped bearing unit 32 is positioned in a space between the vertical axle 16 and the circumference of the aperture 30'.

The rotatable member 10 is moved due to the centrifugal force generated by the turning of a vehicle (not shown). As the vehicle turns, the rotatable weight 12 is turned due to the centrifugal force. This causes the rotatable member 10 and the bending portion 14 to move in the clockwise or counterclockwise direction depending on the turn. As a result, the vertical axle 16 is rotated and the stop lamp 100 is turned according to the rotation of the axle 16. The rotatable weight 12 provides stability to the bending portion 14 and to the rotation of the stop lamp 100.

As shown in FIG. 2, the hydraulic pressure member 20 having a "donut" or ring configuration is provided with the hollow chamber 23. The hollow chamber 23 contains hydraulic pressure oil 23' disposed in an upper chamber 22a and a lower chamber 22b, a partition 24 between the chambers, and a movable member 26 disposed symmetrically to the partition 24. The movable member 26 made of rubber, for example, occupies a section of the hollow chamber 23 and is movable within the hollow chamber 23. The end of the bending portion 14 is fixed in the middle of the movable member 26. The effective length of the movable member 26 is more than twice the effective length of the elongated groove 28. Therefore, even if the bending portion 14 is moved to an end of the elongated groove 28, the hydraulic oil 23' will not leak through the elongated groove 28. Accordingly, turning of the vehicle allows the bending portion 14 to move along the elongated groove 28 without any leakage of the hydraulic oil 23'.

When the vehicle is turning in the left direction, the bending portion 14 and the movable member 26 are moved in the clockwise direction as indicated by arrow B in FIG. 1. As the movable member 26 moves in B direction towards the upper chamber 22a, the hydraulic pressure oil 23' in the upper chamber 22a is squeezed. Accordingly, when the centrifugal force is cancelled by the completion of the turn of the vehicle, the movable member 26 returns to its original position, as shown in FIG. 1, due to the restoration force of the hydraulic pressure oil 23' in the upper chamber 22a.

In turn, when the vehicle is turning in the right direction, the bending portion 14 and the movable member 26 are moved in the counterclockwise direction as indicated by arrow B' in FIG. 1. The movement of the movable member 26 squeezes the hydraulic oil 23' in the lower chamber 22b. Therefore, the completion of the turn restores the movable member 26 and thus the bending portion 14 to their original positions. Accordingly, the stop lamp 100 connected to the rotatable member 10 always turns in the opposite direction of the vehicle's turn so that the stop lamp 100 is immediately and continuously visible to the operator of the rear vehicle.

The rotatable stop lamp device according to the present invention operates as follows. When the vehicle is turning in one way on a curve road, the centrifugal force of the vehicle operates outwardly so that the rotatable weight 12 rotates in the opposite direction of the vehicle turn. As the rotatable weight 12 rotates in one direction, the stop lamp 100 rotates in the same direction so that the stop lamp 100 always faces the driver of the rear vehicle. As a result, the driver of the rear vehicle can quickly detect immediate or abrupt stops of the front vehicle during the turning operation.

More specifically, as shown in FIGS. 1 and 2, if the vehicle turns in the right direction, the rotatable weight 12 rotates in the counterclockwise direction as indicated by arrow A' due to the centrifugal force of the vehicle. At this time, the bending partition 14 and the movable member 26 move towards the lower chamber 22b in the counterclockwise direction as indicated by arrow B'. Consequently, the stop lamp 100 mounted on the axle 16 of the member 10 rotates in the counterclockwise direction as indicated by arrow C'. The stop lamp 100 then always faces the driver of the rear vehicle even when the vehicle is turning, so that the driver of the rear vehicle can always see the stop lamp 100. When the vehicle completes its turn, the rotatable weight 12 returns to its original position. Simultaneously by the restoring force of the hydraulic pressure oil in the lower chamber 22b, the bending portion 14 and the stop lamp 100 return to their original positions.

On the other hand, if the vehicle turns in the left direction, the rotatable weight 12 rotates in the clockwise direction as indicated by arrow A due to the centrifugal force of the vehicle. At this time, the bending portion 14 and the movable member 26 rotate in the clockwise direction as indicated by arrow B. Consequently, the stop lamp 100 rotates in the clockwise direction as indicated by arrow C so that stop lamp 100 always faces the driver of the rear vehicle even when the vehicle is turning. Accordingly, accidents can be prevented.

Figure 3:
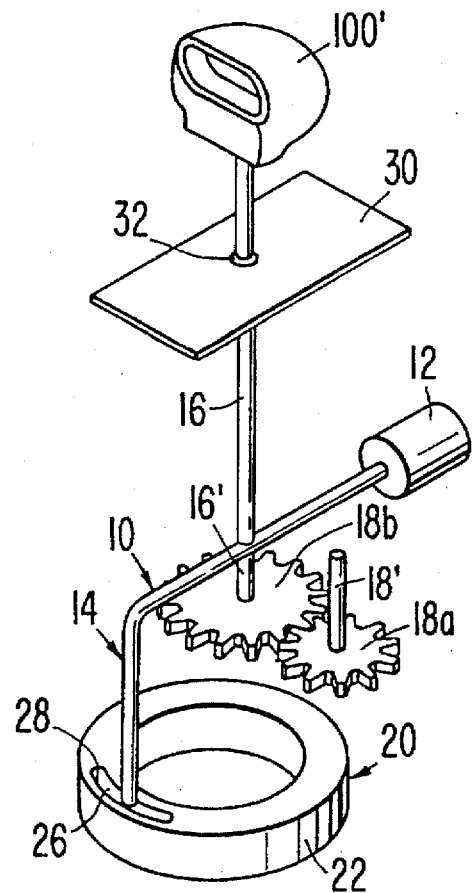
FIG. 3 is a perspective view of another embodiment of the present invention.

Referring in detail to FIG. 3, there is illustrated another embodiment of a rotatable stop lamp device for a vehicle in accordance with the present invention. In the device, a stop lamp 100' is provided with a rotatable vertical axle 16 extending to a first shaft 16'. The first shaft 16' is attached to a first gear 18b which is in gearing relationship with a second gear 18a having a second shaft 18' therethrough. The first shaft 16' and axle 16 are supported by the package tray 30. The other elements (12, 14, 20, 22, 24, 26, 28 and 32) of the rotatable stop lamp device are the same as the elements of the rotatable stop lamp device of the first embodiment, and are indicated by the same references numerals. The ring shaped hydraulic pressure member 20 has the same structure as the one in the first embodiment.

In FIG. 3, the gears 18a and 18b function to provide more control over the turning of the stop lamp 100' and to rotate the stop lamp 100' in a uniform speed, especially when the vehicle turns at high speed. Accordingly, the rotatable stop lamp device of the present invention provides a stop lamp 100 or 100' which turns automatically according to the turn of the vehicle so that the driver of the rear vehicle can see at all times the stop lamp, whereby vehicle accidents can be prevented or the severity thereof can be reduced.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims. For example, the rotatable stop lamp device of the present invention can be installed in cars, toy vehicles, and trains, etc.

What is claimed is:

1. A device for automatically rotating a stop lamp in a vehicle, the device comprising:

a rotatable member having at least first, second and third end portions, the stop lamp being connected to the third end portion of the rotatable member;

a weight mounted on the first end portion of the rotatable member; and a movable member connected to the second end portion of the rotatable member, whereby the stop lamp automatically rotates in a substantially opposite direction of a turn of the vehicle according to centrifugal force from the turn and movement of the weight.

2. A device of claim 1, further comprising:

a container having hydraulic oil and the movable member therein and defining an elongated groove on a top surface of the container, the second end portion of the rotatable member being fixed to the movable member through the elongated groove.

3. A device of claim 2, wherein the container includes a partition positioned substantially symmetrical to the movable member, the partition and the movable member defining an upper chamber and a lower chamber of the container, the upper chamber and the lower chamber each containing the hydraulic oil therein.

4. A device of claim 2, wherein the container has a ring configuration and the movable member occupies a section of the container.

5. A device of claim 2, wherein the effective length of the movable member is more than twice the effective length of the elongated groove.

6. A device of claim 1, further comprising:

a tray having an aperture through which the third end portion of the rotatable member is inserted; and a bearing unit disposed around the aperture of the tray for rotatably connecting the tray and the rotatable member.

7. A device of claim 1, wherein the rotatable member has a T-configuration and a bent.

8. A device of claim 1, wherein when the turn of the vehicle is in the right direction, the rotatable weight is moved in a first direction according to centrifugal force from the turn, which moves the second end portion of the rotatable member and the movable member in the first direction.

9. A device of claim 8, wherein the movement of the second end portion of the rotatable member in the first direction rotates the stop lamp in the first direction.

10. A device of claim 8, wherein the first direction is a counterclockwise direction.

11. A device of claim 1, wherein when the turn of the vehicle is in the left direction, the rotatable weight is moved in a second direction according to centrifugal force from the turn, which moves the second end portion of the rotatable member and the movable member in the second direction.

12. A device of claim 11, wherein the movement of the second end portion of the rotatable member in the second direction rotates the stop lamp in the second direction.

13. A device of claim 11, wherein the second direction is a clockwise direction.

14. A device of claim 1, wherein upon completion of the turn, the stop lamp is automatically restored to its original position.

15. A device of claim 1, further comprising:

a first gear connected to a fourth end portion of the rotatable member; and a second gear in gearing relationship with the first gear so as to control the rotation of the stop lamp.

16. A method of automatically rotating a stop lamp in vehicle, comprising the steps of:

providing a rotatable member having at least first, second and third end portions;

mounting a weight on the first end portion of the rotatable member;

connecting a movable member to the second end portion of the rotatable member; and connecting the stop lamp to the third end portion of the rotatable member, whereby the stop lamp automatically rotates in a substantially opposite direction of a turn of the vehicle according to centrifugal force from the turn and movement of the weight.

17. A method of claim 16, further comprising the steps of:

providing a container having hydraulic oil and the movable member therein and defining an elongated groove on a top surface of the container; and fixing the second end portion of the rotatable member to the movable member through the elongated groove.

18. A method of claim 16, further comprising the steps of:

when the turn of the vehicle is in the right direction, moving the rotatable weight in a first direction according to centrifugal force from the turn; and moving the second end portion of the rotatable member and the movable member in the first direction so as to rotate the stop lamp in the first direction.

19. A method of claim 18, further comprising the steps of:

when the turn of the vehicle is in the left direction, moving the rotatable weight in a second direction according to centrifugal force from the turn; and moving the second end portion of the rotatable member and the movable member in the second direction so as to rotate the stop lamp in the second direction.

20. A method of claim 16, further comprising the steps of:

connecting a first gear with the rotatable member;

providing a second gear in gearing relationship with the first gear; and controlling the rotation of the stop lamp by the gearing relationship of the first and second gears.

* * * * *